United States Patent
Novakov (10) Patent No.: US 9,876,633 B2
(45) Date of Patent: Jan. 23, 2018

(54) METHOD FOR THE RADIO COMMUNICATION OF DIGITAL DATA IN A NOISY ENVIRONMENT

(71) Applicant: UNIVERSITE GRENOBLE ALPES, Saint Martin D'Heres (FR)

(72) Inventor: Emil Novakov, Meylan (FR)

(73) Assignee: UNIVERSITE GRENOBLE ALPES, Saint Martin D'Heres (FR)

( * ) Notice: Subject to any disclaimer, the term of this patent is extended or adjusted under 35 U.S.C. 154(b) by 0 days.

(21) Appl. No.: 15/300,778

(22) PCT Filed: Apr. 1, 2015

(86) PCT No.: PCT/EP2015/057253
§ 371 (c)(1),
(2) Date: Sep. 29, 2016

(87) PCT Pub. No.: WO2015/150488
PCT Pub. Date: Oct. 8, 2015

(65) Prior Publication Data
US 2017/0026168 A1    Jan. 26, 2017

(30) Foreign Application Priority Data
Apr. 1, 2014  (FR) .................................... 14 52870

(51) Int. Cl.
*H04L 7/00* (2006.01)
*H04L 7/04* (2006.01)
*H04B 1/69* (2011.01)

(52) U.S. Cl.
CPC .............. *H04L 7/041* (2013.01); *H04B 1/69* (2013.01); *H04L 7/0079* (2013.01); *H04L 7/0091* (2013.01)

(58) Field of Classification Search
CPC ... H04L 27/2656; H04L 7/042; H04L 7/0143; H04L 2025/03414; H04L 5/026;
(Continued)

(56) References Cited

U.S. PATENT DOCUMENTS

| 4,518,947 A | 5/1985 | Poston et al. | |
|---|---|---|---|
| 2013/0094517 A1* | 4/2013 | Kim | H04L 29/02 370/474 |
| 2013/0294532 A1* | 11/2013 | Inagawa | H04L 1/0071 375/257 |

FOREIGN PATENT DOCUMENTS

EP    2509248 A2    10/2012

OTHER PUBLICATIONS

European Patent Office, International Search Report for PCT/EP2015/057253, dated Apr. 1, 2015.
(Continued)

*Primary Examiner* — Rahel Guarino
(74) *Attorney, Agent, or Firm* — Kevin R. Erdman; Brannon Sowers & Cracraft PC (57) ABSTRACT

The invention relates to a device for the radio transmission of a data word between a transmitter (1) and a receiver (65), comprising a transmitter (1) that can transmit at least one block of data comprising a preamble word and a data word repeated several times; an elementary synchronization block allowing the synchronization of the receiver (65) to the transmitter (1) and the detection of the preamble word; and a synchronous averaging device (67) calculating the average of the data word repeated.

15 Claims, 5 Drawing Sheets

(58) Field of Classification Search
CPC ........ H04L 2027/0095; H04L 27/2675; H04B 3/546; H04B 3/54; H04B 1/69; H04B 3/542; H04J 13/00; H04J 13/0029; H04J 13/0033
USPC ....... 375/365, 368, 150, 367, 130, 260, 355, 375/343, 366; 370/324, 350, 503, 514, 370/510, 513, 515
See application file for complete search history.

(56) References Cited

OTHER PUBLICATIONS

European Patent Office, International Search Report for PCT/EP2015/057253, dated Aug. 20, 2015.

* cited by examiner

METHOD FOR THE RADIO COMMUNICATION OF DIGITAL DATA IN A NOISY ENVIRONMENT

CROSS-REFERENCE TO RELATED APPLICATIONS

The present application is a National Stage of PCT International Application Serial Number PCT/EP2015/057253, filed Apr. 1, 2015, and claims priority under 35 U.S.C. § 119 of French Patent Application Serial Number 14/52870, filed Apr. 1, 2014, the disclosures of which are incorporated by reference herein.

BACKGROUND

The present application relates to a method of digital data radio communication in a noisy environment. The present application more specifically relates to the case where the quantity of information to be transmitted by the transmitter is small, for example, a number with seven decimal digits corresponding to a meter reading.

DISCUSSION OF RELATED ART

Figure 1A:
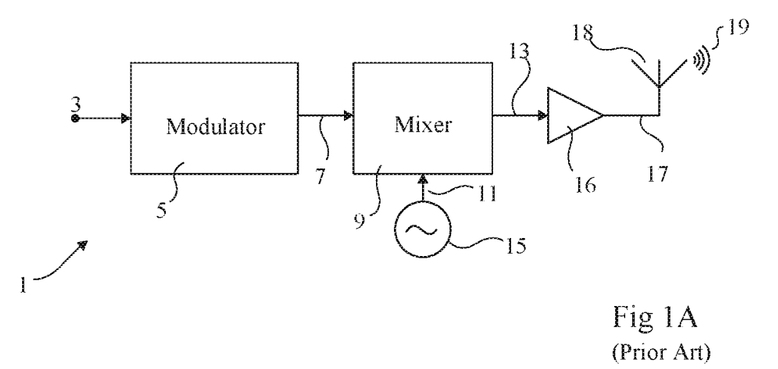
FIGS. 1A and 1B, previously described, illustrate in the form of blocks an example of a transmitter and of a receiver adapted for digital data radio transmission.
Figure 1B:
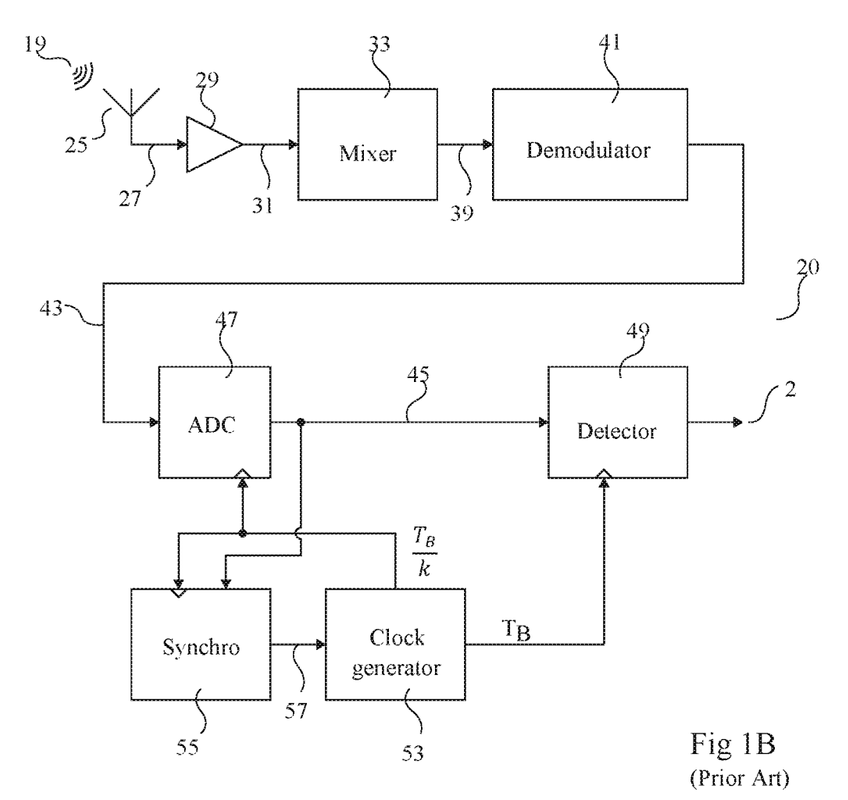

An example of a transmitter and of a receiver adapted to a radio transmission of digital data is illustrated in FIGS. 1A and 1B, in the form of functional blocks.

FIG. 1A shows a transmitter 1 which receives digital data, sampled at a period TA, on its input 3. The digital data are transmitted to a modulator 5 which turns them into a modulation signal 7. A plurality of modulation types are possible, for example, an amplitude modulation, a phase modulation, a frequency modulation, or a quadrature amplitude modulation.

Modulation signal 7 is sent to a mixer 9 which transposes modulation signal 7 around a carrier frequency 11 to supply a modulated signal 13. Carrier frequency 11 is supplied by an oscillator 15. Signal 13 is amplified by a radio frequency amplifier 16.

Signal 17 is sent to an antenna 18 which turns it into an electromagnetic wave 19 to transmit the signal by radio link.

FIG. 1B shows a receiver 20 which receives radio wave 19, transmitted by transmitter 1, on an antenna 25 which supplies an analog signal 27. Signal 27 corresponds to signal 17 of FIG. 1A, superposed to noise. Signal 27 is amplified by a selective low-noise amplifier 29 to supply an amplified modulated signal 31. Signal 31 is transmitted to a mixer 33 which supplies a signal 39 which corresponds to the modulation signal transposed on an intermediate frequency carrier. Signal 39 is sent to a demodulator 41 which demodulates it to extract an analog signal 43 therefrom. Signal 43 is converted into a signal 45 sampled by an analog-to-digital converter (ADC) 47. Signal 45 is sent to a detector 49 which restores digital data 2. A clock generator 53 generates a signal of period TB and a signal of period TB/k setting the sampling frequency of ADC 47. Signal TB is transmitted to detector 49 while sampling signal TB/k is transmitted to converter 47. Period TB should be as close as possible to sampling period TA of the transmitted digital data and synchronized therewith. It is currently provided to control signal TB with the received signal 43. A control loop comprising a synchronization block 55 receiving output signal 45 of ADC 47 and sending a signal 57 to clock generator 53 has been symbolically shown.

The disadvantage of such a method is that, in the case where signal 43 is noisy, detector 49 starts making errors and no longer properly detecting signal 45. Further, there is a risk of synchronization loss by block 55, which further increases errors. A conventional way of solving this problem is to use a spread spectrum method. Such a method enables, by an artificial increase of the width of the spectrum of the transmitted signal, to decrease certain disturbances which superpose to the signal during the radio transmission. This method is expensive and complex to implement. It is necessary to add a spread spectrum system capable of coding signal 7 at the transmitter 1 and a complex and sophisticated signal processing system at receiver 20. Cathode: $Q+2H++ 2e- \rightarrow QH2$

SUMMARY

Applications such as remote reading of water, gas, power meters or any type of systems which transmit or receive information spaced in time with a low rate are here considered. It is desired for each counter to be equipped with a radio transmitter to transmit information to allow a remote reading of the content of the meter.

Thus, an embodiment provides a method of radio transmission of a data word between a transmitter and a receiver, comprising the steps of transmitting at least one data block comprising a preamble word known by the receiver and stored therein, followed by a data word repeated a plurality of times; detecting the preamble word; synchronizing the receiver to the transmitter; synchronously averaging the repeated data word; and detecting the transmitted data based on the synchronous averaging.

According to an embodiment, the transmitted data words are oversampled by the receiver.

According to an embodiment, the detection and synchronization steps comprise the steps of performing correlations between the transmitted preamble word and second preamble words corresponding to the stored preamble word rated at the period of the receiver clock plus or minus an increment different from one second preamble word to another; and detecting the correlation having the highest rate and adding or removing the increment corresponding to the receiver clock.

According to an embodiment, the synchronous averaging step comprises the steps of receiving a data word repeated a plurality of times; storing each of the bits of the first received data word into a storage register; adding the value of each box of the storage register to each bit of the next data words; and dividing the value of each box of the register by the number of repetitions of the data word.

According to an embodiment, the method comprises the steps of verifying whether the detected data are correct; and if not, starting the operation again with an increase in the number of repetitions of the transmitted data word.

According to an embodiment, the method comprises the steps of providing a plurality of preamble words, each being associated with a different number of repetitions of the data word; performing, for each stored preamble word, correlations between the transmitted preamble word and second preamble words corresponding to the stored preamble word rated at the period of the receiver clock plus or minus an increment different from one second preamble word to another; performing the synchronous averaging according to the number of repetitions of the data word associated with the detected preamble word; and if the data word associated with the preamble word is detected, sending a response to the transmitter so that it sends data words with the same number of repetitions as the detected data word; if not, sending to the receiver a data block with a number of repetitions of the data word greater than the previous one.

Another embodiment provides a device of radio transmission of a data word between a transmitter and a receiver, comprising a transmitter capable of transmitting at least one data block comprising a preamble word and a data word repeated a plurality of times; an elementary synchronization block enabling to synchronize the receiver to the transmitter and to detect the preamble word; and a synchronous averager which averages the repeated data word.

According to an embodiment, the elementary synchronization block comprises a memory containing a stored preamble word; a plurality of correlators, each correlator having a first input receiving the transmitted preamble word, a second input receiving the stored preamble word rated at the period of the receiver clock plus or minus an increment different for each correlator, and an output supplying the correlation rate between the two inputs; and a controller detecting the correlator providing the highest correlation rate.

According to an embodiment, the device comprises a plurality of elementary synchronization blocks, each of which is capable of detecting a specific preamble word.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings.

DETAILED DESCRIPTION

Figure 2:
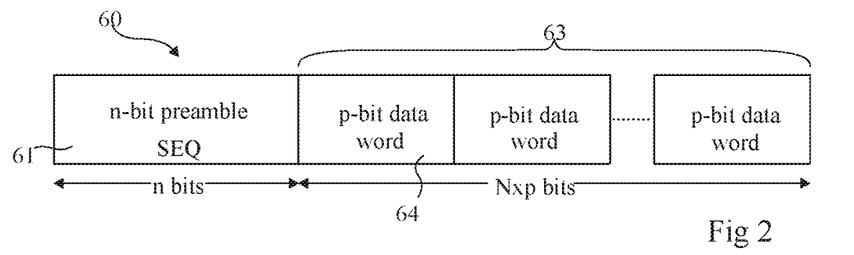
FIG. 2 illustrates, in the form of blocks, a data format used in a digital data radio transmission according to an embodiment of the present invention.

FIG. 2 illustrates a data block 60 used in a digital data radio transmission according to an embodiment of the present invention. Data block 60 has a specific format and comprises two types of information, a preamble word 61 and a succession of binary data words 63. Preamble word 61 is a sequence of n bits (n being for example smaller than 50 bits). The sequence may be pseudo-random (PN) and is selected to have good autocorrelation properties, for example, a Kasami or Gold sequence. The preamble word is known by the receiver. The succession of data words 63 contains identical data words 64 of p bits periodically repeated N times (N being for example in the range from 2 to 50).

Figure 3A:
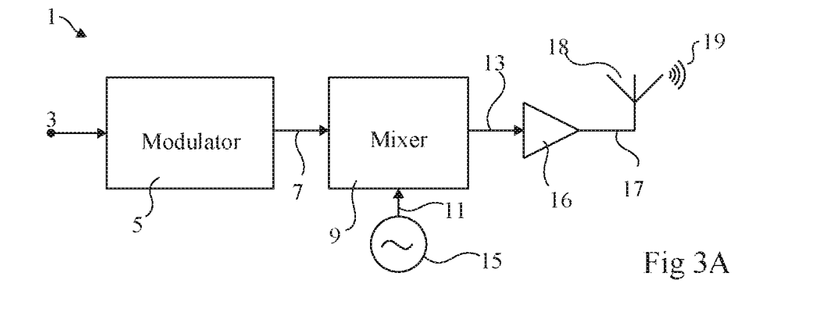
FIGS. 3A and 3B illustrate, in the form of blocks, a transmitter and a receiver adapted for digital data radio transmission according to an embodiment of the present invention.
Figure 3B:
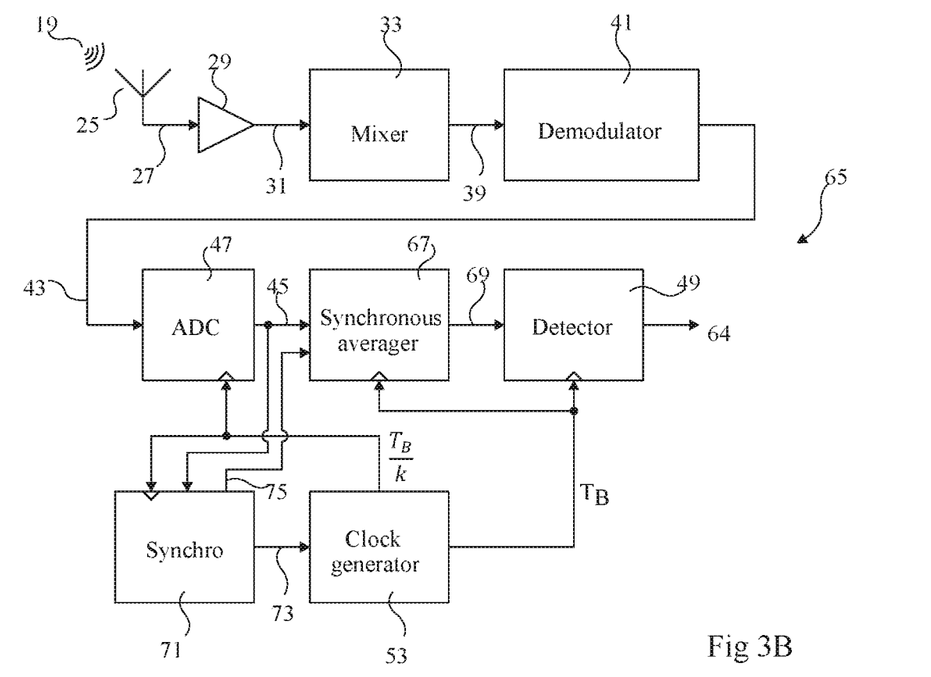

FIGS. 3A and 3B illustrate, in the form of blocks, a transmitter and a receiver adapted for digital data radio transmission.

FIG. 3A shows a transmitter 1 similar to that described in relation with FIG. 1A. Transmitter 1 comprises a modulator 5, a mixer 9, an oscillator 15, an amplifier 16, and an antenna 18. Transmitter 1 receives on its input 3 data corresponding to a succession of data blocks 60 such as illustrated in FIG. 2 and sends an electromagnetic wave 19.

FIG. 3B shows a receiver 65 comprising an antenna 25, a selective amplifier 29, a mixer 33, a demodulator 41, and an analog-to-digital converter (ADC) 47 such as described in relation with FIG. 1B.

Output signal 45 of converter 47 is directed to a synchronous averager 67, described hereafter, which sends a signal 69 to a detector 49. Output signal 45 is also directed to a specific synchronization block 71, described hereafter, which sends a signal 73 to clock generator 53 and which sends an activation signal 75 to synchronous averager 67. Detector 49 turns signal 69 into data word 64.

Clock generator 53 supplies a signal of period $T_B$ transmitted to detector 49 and an oversampling signal of period $T_B/k$ transmitted to converter (ADC) 47 and to synchronous average 67, k being an integer greater than 2, for example, in the range from 2 to 8. Clock generator 53 and detector 49 are similar to those described in relation with FIG. 1B.

A succession of data blocks 60, such as that illustrated in FIG. 2, is applied to input 3 of transmitter 1. Preamble word 61 is first considered, after which the data words 63 of a data block 60 are considered.

The ADC converter has an r-bit resolution, r being in the range from 4 to 16. At each period $T_B/k$, the ADC supplies on its output 45 an r-bit piece of data corresponding to a value of analog signal 43. The r-bit piece of data at output 45 of the ADC is sent to synchronization block 71. Synchronization block 71 recognizes preamble word 61. Once the preamble word has been recognized, block 71 sends a signal 73 to clock generator 53 to synchronize this clock to the transmitter clock and sends an activation signal 75 to synchronous averager 67.

The r-bit piece of data at output 45 of the ADC is also sent to synchronous averager 67, which is activated once preamble word 61 has been recognized. Averager 67 knows number N of data words contained in the succession of identical data words 63 following preamble word 61. The averager provides an average of the N data words 64 to supply an averaged signal 69 sampled at $T_B$. Signal 69 at the output of averager 67 is sent to detector 49 so that it turns it into the desired binary data word 64.

The synchronous averaging performed by synchronous averager 67 enables to improve the ratio of the power of the signal to the power of the noise of a transmitted data word 64. This improvement is by a factor in the order of N in the case where the noise superposed to data word 64 is Gaussian white noise and where data word 64 is repeated N times. This enables to increase the effective sensitivity of the receiver and the transmission distance without increasing the transmission power. As an example, for an analog signal superposed to Gaussian white noise for which the signal-to-noise ratio is equal to 0.1 (that is, −10 dB), if the signal is repeated 50 times, a ratio of the signal power to the noise power improved 50 times is obtained. The ratio becomes equal to 5, that is, a 17-dB improvement.

The receive system operates in two steps, that is, an acquisition/synchronization phase and an averaging phase. In the first phase, synchronization block 71 detects in received signal 43 the presence of preamble word 61 and adjusts the frequency and the phase of the clock signal of period $T_B$. During the second phase, synchronous averager 67 averages data words 64 and improves the ratio of signal power to the noise power.

Figure 4:
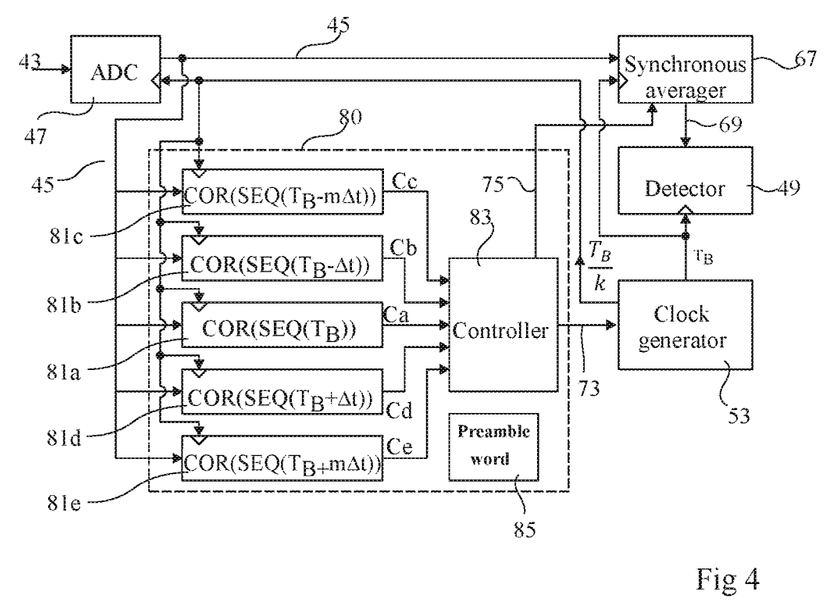
FIG. 4 illustrates, in the form of blocks, an embodiment of a block of synchronization of a receiver such as that of FIG. 3B.

FIG. 4 shows an embodiment of a block 80 for synchronizing a receiver such as that in FIG. 3B. The total number of correlators is (1+2·m), m being the number of periods ΔT to be added to and to be removed from the period of signal $T_B$. m is in the range from 1 to 4, for example 2 as illustrated in FIG. 4.

Synchronization block 80 comprises a plurality of correlators in parallel, five in this example (m=2), 81a to 81e, and a controller 83. Signal 45, oversampled at period $T_B/k$, at the output of ADC 47 is transmitted to each correlator. Outputs $C_a$ to $C_e$ of correlators 81a to 81e are sent to controller 83, an output 73 thereof being sent to clock generator 53.

A preamble word 85, comprising a bit sequence identical to that of the transmitted preamble word 61, is stored in synchronization block 80. The correlators are rated at period $T_B/k$. Correlator 81a COR(SEQ($T_B$)) correlates the r-bit data with preamble word 61 (SEQ) at period $T_B$. Correlator 81b COR(SEQ($T_B$−ΔT)) correlates the r-bit data with preamble word 61 (SEQ) compressed in time by ΔT. Correlator 81c COR(SEQ($T_B$−mΔT)) correlates the r-bit data with preamble word 61 (SEQ) compressed in time by mΔT. Correlator 81d COR(SEQ($T_B$+ΔT)) correlates the r-bit data with preamble word 61 (SEQ) expanded in time by ΔT. Correlator 81e COR(SEQ($T_B$+mΔT)) correlates the r-bit data with preamble word 61 (SEQ) expanded in time by mΔT. In this example, m=2. ΔT is a time period, previously selected to be in the range from 0.5% to 1% of $T_B$.

Each correlator determines a correlation rate, respectively $C_a$ to $C_e$. Correlation rates $C_a$ to $C_e$ are sent to controller 83. Controller 83 detects the highest correlation rate as well as the time at which this rate appears.

If the transmitter and the receiver have exactly the same sampling period ($T_A=T_B$) at the time when the r-bit data correspond to preamble word 61 stored in synchronization block 71, signal Ca is maximum. Generally, sampling period $T_A$ is different from sampling period $T_B$, the maximum correlation rate will thus appear at the output of one of correlators j for which $T_B=T_A+jΔT$, j being an integer in the range from −m to m.

Thus, synchronization block 80 enables to estimate the time shift j ΔT between $T_A$ and $T_B$, to detect the preamble word 61 contained in the received signal, and to estimate the time difference j ΔT between the clocks. This is the frequency synchronization. The time of occurrence of the highest correlation rate corresponds to the time synchronization (phase synchronization).

Output signal 73 of controller 83 is sent to clock generator 53. Signal 73 contains a piece of data corresponding to increment jΔT to be added to or to be removed from the period of signal $T_B$ so that the clock period of the receiver is as close as possible that of the transmitter clock. The increment (positive or negative) contained in signal 73 (+2ΔT, +ΔT, 0, −ΔT, −2ΔT) is added to period $T_B$. Signal 73 also contains data corresponding to the time when a high correlation rate is detected. According to these data, period $T_B$ is shifted in time to be in phase with period $T_A$. The clock of receiver 53 is thus adjusted in frequency and in phase to the clock of transmitter $T_A$. At the end of the detection of the preamble word, $T_B=T_A$.

Figure 5:
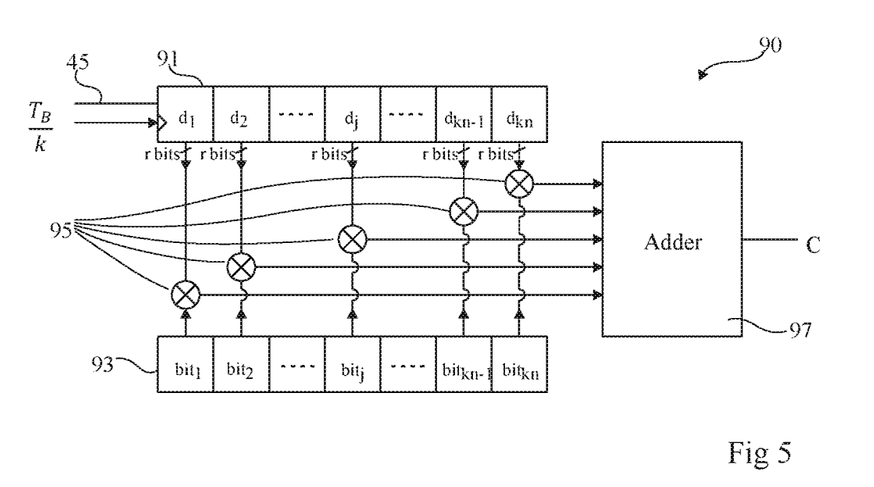
FIG. 5 illustrates an embodiment of a correlator contained in the block of synchronization of a receiver such as that of FIG. 3B.

FIG. 5 illustrates an embodiment of one of the correlators of FIG. 4. FIG. 5 shows an example of a correlator 90. This correlator comprises a shift register 91, a storage register 93, multipliers 95, and an adder 97. Register 91 comprises $d_j$ r-bit data, with j ranging from 1 to kn. At each period $T_B/k$, data $d_j$ are shifted by one position to the right. Register 93 comprises k times n bits. Multipliers 95 are as many as kn, k being the number of samples per bit of data words 64, in the range from 2 to 8, and n being the number of bits in preamble word 61. Register 91 is rated at sampling period $T_B/k$. Stored preamble word 85, expanded or compressed (±mΔT) differently for each correlator, is stored in register 93. The kn multipliers 95 multiply each bit of data $d_j$ by bit j of the preamble word stored in correlator 90, with j ranging from 1 to kn. Adder 97 receives the results of the kn multipliers 95 and determines correlation rate C. Since, here, preamble word 61 is a binary word +1 or −1, the multiplication may be performed by the XOR function.

After the acquisition/synchronization phase, the averaging phase, rated at period $T_B$, starts.

Figure 6A:
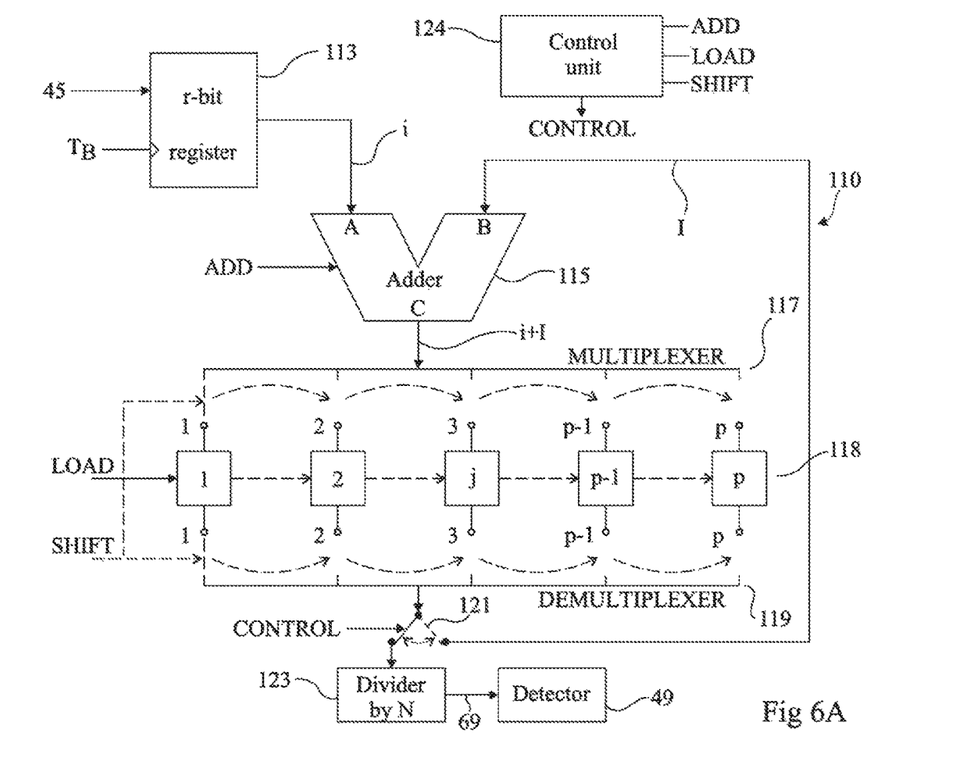
FIGS. 6A and 6B illustrate two embodiments of a synchronous averager such as that in FIG. 3B.
Figure 6B:
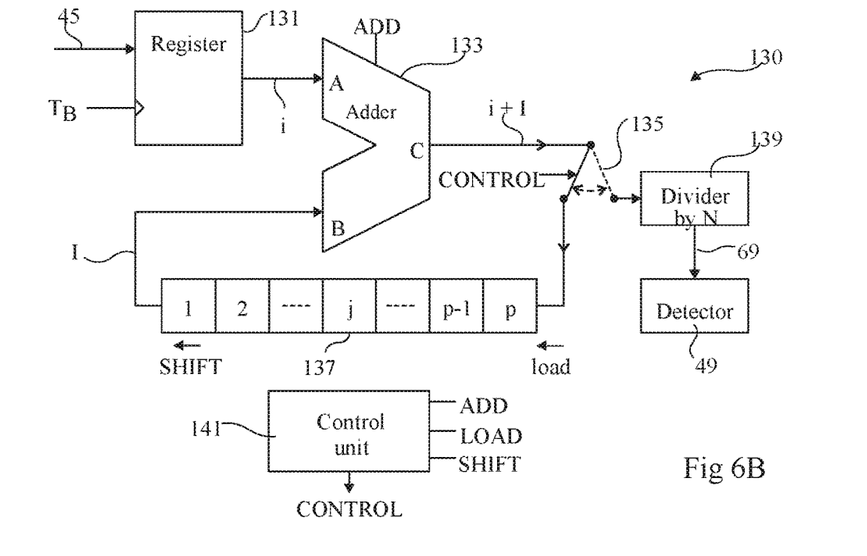

FIGS. 6A and 6B illustrate two embodiments of a synchronous averager such as that in FIG. 3B. The embodiment of FIG. 6A shows a synchronous averager which can be formed by hardware means. The embodiment of FIG. 6B shows a synchronous averager which may preferably be formed by software means.

FIG. 6A shows a synchronous averager 110 comprising a register 113 which receives the r-bit data from output 45 of ADC 47. Register 113 sends r-bit data i to a first adding input A of an adder 115, at the rate of signal $T_B$, with i ranging from 1 to p, p being the number of bits in data word 64. $T_B$ is the clock obtained after the phase and frequency synchronization of the receiver clock to that of the transmitter ($T_A$). The fact of recording the data at output 45 of the ADC into register 113 at rate $T_B$ is equivalent to dividing by k the number of data at the output of the ADC.

Adder 115 receives on a second adding input B a word I. Adder 115 is controlled by a signal ADD. Output C of the adder, corresponding to a word i+I, is sent to a multiplexer 117. Data i at input A comprise r bits. Since sum A+B is performed N times, output data C may comprise up to R bits, R=r+L bits, L being the greatest integer close to log 2(N). For example, if r=8 and N=50, L=6, and thus word i+I of output C comprises 14 bits.

Multiplexer 117 directs output C of adder 115 to one of the R-bit memories j of register 118, with j ranging from 1 to p. Multiplexer 117 is controlled by a signal SHIFT. Signal SHIFT enables to select memory j to be connected to output C of the adder.

Register block 118 comprises p inputs and p outputs corresponding to the p memories of register block 118. Block 118 receives output C of adder 115, directed by multiplexer 117, onto one of the p inputs of block 118. A control signal LOAD enables to provide at the output of a memory j word I stored in this memory.

A demultiplexer 119 directs the output of one of the p memories to the input of a switch 121. Demultiplexer 119 is controlled by signal SHIFT. Multiplexer 117 and demultiplexer 119 are synchronized, that is, if multiplexer 117 directs output C of adder 113 to the input of a memory j, demultiplexer 119 directs the input of switch 121 to the output of the same memory.

Switch 121 receives a word I, contained in memory j of block 118. Switch 121 is controlled by a signal CONTROL.

The switch directs word I to input B of adder 115 when signal CONTROL is in the low state. Otherwise, word I is directed to a divider by N 123.

Divider 123 receives a word I, contained in one of memories j, and divides it by N. Divider 123 supplies detector 49 with average 69 of data i of the N transmitted data words, with i ranging from 1 to p.

The system of FIG. 6A performs the following calculation:

$$R_j = \frac{1}{N}\sum_{i=1}^{N} S_{ji},$$

where $R_j$ is the average of the data $d_j$ of N transmitted data words 64, with j ranging from 1 to p, $S_{ji}$ being an R-bit piece of data, and N being the number of transmitted data words.

A control unit 124 supplies control signals ADD, SHIFT, LOAD, and CONTROL.

The synchronous averager of FIG. 6A operates as follows.

On activation of synchronous averager 110 by synchronization block 71 (see FIG. 3B), the averager is initialized. The memories of block 118 are set to zero, signals ADD, SHIFT, LOAD, and CONTROL are in the low state. Multiplexer 117 directs output C of adder 115 to memory 1. Demultiplexer 119 directs the input of switch 121 to the output of memory 1.

On each rising edge of signal $T_B$, register 113 sends data i from output 45 of the ADC to input A of adder 115. Control unit 124 sends a pulse ADD to adder 115. The rising edge of pulse ADD activates adder 115 which adds data i received at its input A and word I of its input B and then sends the resulting word i+I to the input of memory j, connected by multiplexer 117. At the falling edge of pulse ADD, control unit 124 sends a pulse SHIFT to multiplexer 117 and to demultiplexer 119. The rising edge of pulse SHIFT enables to direct output C of adder 115 from the input of memory j to the input of memory j+1 and enables to direct the input of switch 121 from the output of memory j to the output of memory j+1. At the falling edge of pulse SHIFT, control unit 124 sends a pulse LOAD to register block 118. The word I contained in memory j+1 is supplied to the output of the memory and sent to input B of adder 115. At the falling edge of pulse LOAD, the processing of data i is over and the synchronous averager is ready to process data i+1 at the next period $T_B$. The p r-bit data are received N times. Each memory j of register block 118 contains the sum of data i of the N transmitted data words 64.

Pulses ADD, SHIFT and LOAD have a duration shorter than period $T_B$ divided by 3. When multiplexer 117 and demultiplexer 119 are connected to memory p and a new memory shift is requested, multiplexer 117 and demultiplexer 119 connect to memory 1 of register 118.

When the control unit detects that the p r-bit data have been received N times and processed, signal CONTROL is set to the high state and the input of switch 121 is directed to divider 123. A pulse LOAD controls that word I contained in memory j is output. Word I is sent to divider 123 and is divided by N. Divider 123 supplies the average of the first data of p-bit block 64 transmitted N times to detector 49. At the falling edge of pulse LOAD, a pulse SHIFT connects memory j+1 of register block 118. The two steps carried out after the setting to the high state of signal CONTROL are performed p times. The synchronous averager thus supplies the average of the r-bit data i of the N data words transmitted to detector 49, which corresponds to the average of the transmitted p-bit signal.

FIG. 6B shows a synchronous averager 130 comprising a register 131 which receives the r-bit data at output 45 of ADC 47. Register 131 sends r-bit data i to a first adding input A of an adder 133, at the rate of signal $T_B$.

Adder 133 receives on a second adding input B a word I originating from a register of p words of R bits 137. Adder 133 is controlled by a signal ADD. Output C of the adder, corresponding to a word i+I, is sent to a switch 135. The switch is controlled by a signal CONTROL. Switch 135 directs word i+I to register 137 when signal CONTROL is in the low state, otherwise word i+I is directed to a divider by N 139. Register 137 is controlled by signals SHIFT and LOAD.

Register 137 receives output C of adder 133 when signal CONTROL is in the high state. The divider divides by N word i+I, which corresponds to the sum of the data i of the N transmitted bits. The divider sends the average of the r-bit data i of the N transmitted words to detector 49.

The synchronous averager of FIG. 6B operates as follows.

On activation of synchronous averager 130 by synchronization block 67, the averager is initialized. Shift register 137 is set to zero, signals ADD, SHIFT, LOAD, and CONTROL are in the low state.

Register 131 sends data i to input A of adder 133 at the rate of period $T_B$. A pulse ADD is sent to adder 133. The rising edge of pulse ADD activates adder 133 which adds data i received at its input A and word I of its input B and then sends the resulting word i+I to the input of switch 135. Switch 135 directs its input to the input of register 137. At the falling edge of pulse ADD, a pulse SHIFT is sent to register 137. The rising edge of pulse SHIFT enables register 137 to supply a word I to input B of adder 133. At the falling edge of pulse SHIFT, a pulse LOAD is sent to register 137, the rising edge of pulse LOAD enables to load word i+I at the output of switch 135. At the falling edge of pulse LOAD, the processing of data i is over and the synchronous averager is ready to process data i+1 at the next period $T_B$.

Once the p expected data are received N−1 times, control unit 141 sets signal CONTROL to the high state and the input of switch 135 is directed to the divider by N 139. The p words contained in register 137 are added to the p data of the last transmitted data word. Adder 133 sends to divider 139 the sum of the data i of the N transmitted words. Divider 139 supplies average 69 of the data i of the N transmitted data words to detector 49, which corresponds to average 69 of the transmitted p-bit signal.

According to an aspect of the present invention, it is desired to decrease the quantity of data to be transmitted by performing the synchronous averaging with as little data word repetitions as possible. It is started by sending a data word repeated a small number of times, for example, N=10 times. If the data word is properly received by the synchronous averaging receiver, the receiver sends an acknowledgement to the transmitter. The acknowledgement comprises sending back the received data word by also repeating it N=10 times. The communication is established and the system operates by repeating the data N=10 times. If the word is not properly received and if the wait for the acknowledgement from the receiver to the transmitter is greater than a duration $T_{CONF}$, the transmitter sends once again the data word repeated more times than the previous time, in this example, N=20 times. This procedure is repeated as many times as necessary. If after a maximum number of repetitions $Q_{MAX}$, the communication is not completed, the connection is assumed to be impossible. To indicate the number of transmitted data words to the synchronous averager, a specific preamble word characterizing the number of repetitions of the data word is sent upstream of the periodically-repeated data word.

Figure 7:
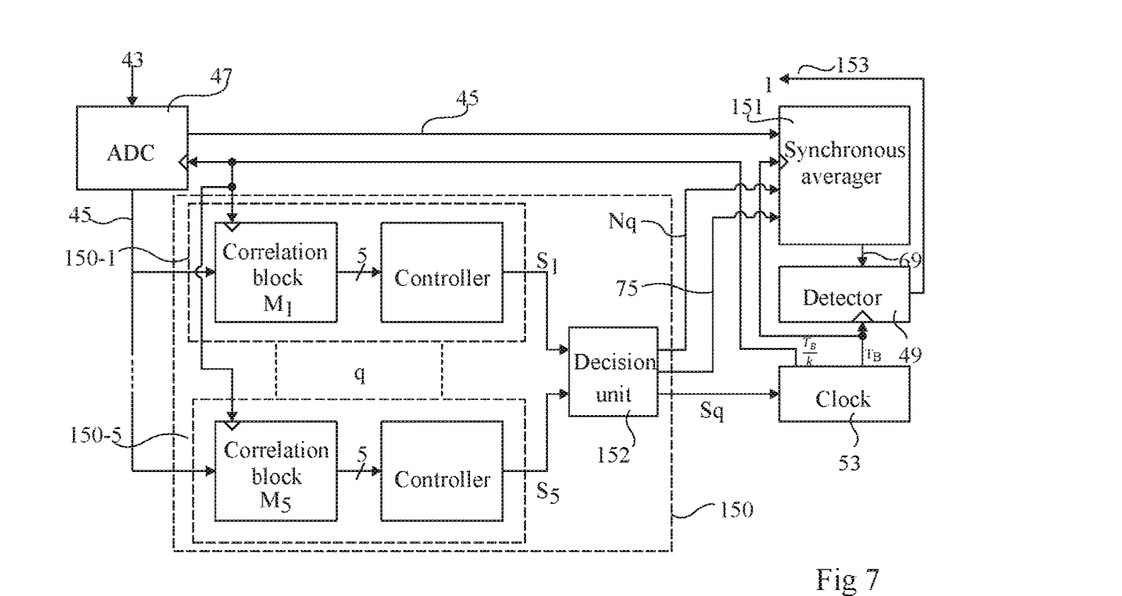
FIG. 7 illustrates another embodiment of a block of synchronization of a receiver such as that in FIG. 3B.

FIG. 7 shows an embodiment of a synchronization block 150 and of a synchronous averager 151 contained in a receiver, such as that described in relation with FIG. 3B, enabling to optimize the number of repetitions of the data word to be transmitted.

Synchronization block 150 comprises a plurality of elementary synchronization blocks, for example, five, 150-1 to 150-5. Each of the elementary blocks is for example identical to block 80, described in relation with FIG. 4. Blocks 150-1 to 150-5 are connected in parallel. Each elementary synchronization block 150-$q$ (with q ranging from 1 to 5 in this example) receives signal 45 from the output of ADC 47 and then sends a signal $S_q$ to a decision unit 152. Decision unit 152 receives signals $S_q$ from elementary blocks 150-$q$ and then sends signal $S_q$ to clock 53 as well as data $N_q$ and an activation signal 75 to synchronous averager 67. Each elementary synchronization block 150-$q$ contains in its memory a specific preamble word $M_q$, such as preamble word 61 described in relation with FIG. 2. Synchronous averager 151 receives data $N_q$ and signal 45 from the output of ADC 47 and sends an averaged signal 69 to the detector. The detector sends a signal on an output 153 to transmitter 1.

Synchronization block 150 and averager 151 operate as follows.

Elementary synchronization blocks 150-1 to 150-5 receive output signal 45 of the ADC. Each block 150-$q$ compares signal 45 with the preamble word $M_q$ that it contains. The block 150-$q$ which detects the transmitted preamble word $M_q$ sends a signal $S_q$ to decision unit 152, $S_q$ corresponding to signal 73 described in relation with FIG. 4. Decision unit 152 sends to the synchronous averager a number $N_q$ according to the detected preamble word $M_q$. Number $N_q$ is the number of repetitions of the transmitted data word and is for example in the range from 10 to 50. Synchronous averager 151 averages the data word repeated $N_q$ times and sends data 69 to detector 49. If the data are properly detected, detector 49 sends on output 153 a response to transmitter 1. The response corresponds to the acknowledgement of the receiver to the transmitter which comprises sending back the received data word by repeating it the same number of times than on transmission.

Figure 8:
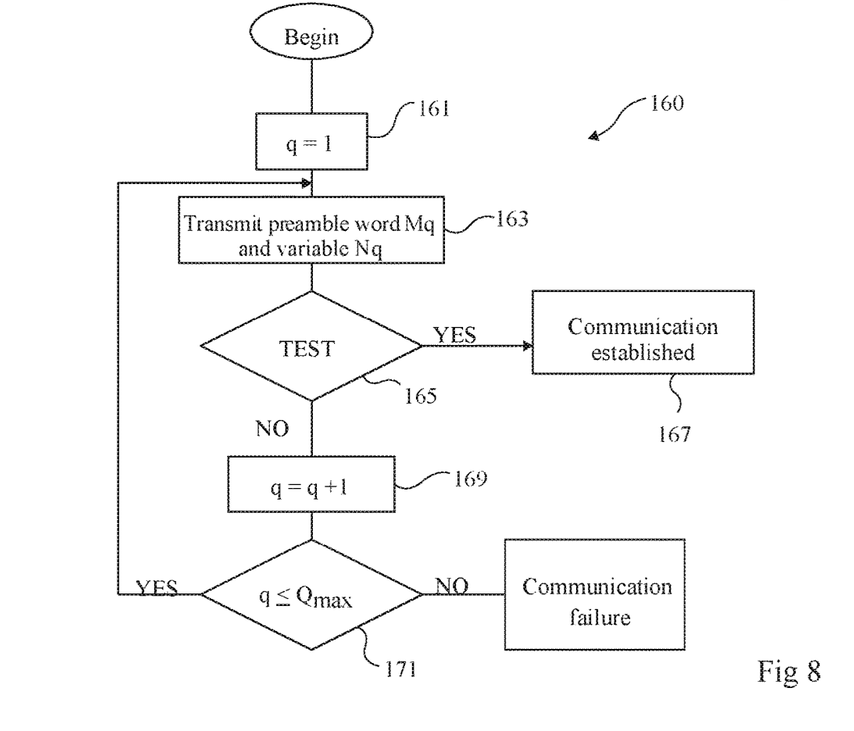
FIG. 8 shows a functional diagram of a receiver such as that in FIG. 3B using a synchronization block of the type illustrated in FIG. 7.

FIG. 8 shows a functional diagram 160 of a communication system based on the receiver of FIG. 3B, using a synchronizer 150 and a synchronous averager 151 of the type illustrated in FIG. 7 capable of optimizing the number of repetitions of a data word. A block 161 is initialized to q equal 1. At the beginning of a communication, a first data block 60, such as described in relation with FIG. 2, containing a preamble word $M_1$ and a data word repeated $N_1$ times, is transmitted.

At a first step, block 163, preamble word $M_q$ is transmitted and number $N_q$ characterizing the number of repetitions of the data word is sent to synchronous averager 151.

At the next step, block TEST 165, the transmitter waits, for a time $T_{CONF}$, for the response from the receiver indicating that the transmitted signal 43 has been properly received. If the response to the condition of block TEST 165 is YES, the communication is established, at block 167. If the response to the condition of block TEST 165 is NO, variable q is incremented by 1 (block 169) and sent to condition block 171.

At the next step, condition block 171, it is verified that word $Q_{max}$ of preamble words available to establish a communication has not been reached. If $Q_{max}$ has been reached, the response to the condition of block 171 is NO. The system stops and the communication is not established (communication Failure). If $Q_{max}$ has not been reached, the response to the conditions of block 171 is YES, a new data block 60 containing a new preamble word $M_{q+1}$ and a data word repeated $N_{q+1}$ times is sent again. The system returns to the step of block 163.

As an example of numerical values:
   the size of the preamble word is in the range from 16 to 128 bits, for example, 32 bits;
   the size of a data word is in the range from 16 to 256 bits, for example, 32 bits;
   number N of repetitions is in the range from 4 to 50, for example, 10.
   the number of synchronization blocks 80 contained in synchronizer 150, defined by q, is in the range from 3 to 7, for example, 5.

Although synchronization block 80 contains five correlators in the example described in relation with FIG. 4, synchronization block 80 may contain a different number of correlators, for example, seven.

The invention claimed is:

1. A method of radio transmission of a data word between a transmitter and a receiver, comprising the steps of:
   transmitting at least one data block comprising a preamble word known by the receiver and stored therein, followed by the data word identically repeated a plurality of times, the identically repeated data words being directly transmitted one after the other without transmitting any other word therebetween;
   detecting the preamble word;
   synchronizing the receiver to the transmitter, in phase and in frequency, during the reception of the preamble word;
   synchronously averaging the identically repeated data words; and
   detecting the transmitted data word based on the synchronous averaging;
   wherein the synchronous averaging step comprises the steps of:
   receiving a data word repeated a plurality of times;
   storing each of bits of a first received data word into a storage register;
   adding a value of each box of the storage register to each bit of next data words; and
   dividing the value of each box of the storage register by a count of the identically repeated data words.

2. The method of claim 1, wherein the transmitted data words are oversampled by the receiver.

3. The method of claim 1, wherein the detection and synchronization steps comprise the steps of:
   performing correlations between the transmitted preamble word and second preamble words corresponding to the stored preamble word rated at a period of a receiver clock plus or minus an increment different from one second preamble word to another; and
   detecting a correlation having a highest rate and adding or removing the increment corresponding to the receiver clock.

4. The method of claim 1, comprising the steps of:
   verifying whether the detected transmitted data are correct; and
   if not, starting operation again with an increase in the number of repetitions of the transmitted data word.

5. The method of claim 3, comprising the steps of:
  providing a plurality of preamble words, each being associated with a different number of repetitions of the data word;
  performing, for each stored preamble word, correlations between the transmitted preamble word and second preamble words corresponding to the stored preamble word rated at the period of the receiver clock plus or minus an increment different from one second preamble word to another;
  performing the synchronous averaging according to the number of repetitions of the data word associated with the detected preamble word;
  if the data word associated with the preamble word is detected, sending a response to the transmitter so that it sends data words with the same number of repetitions as the detected data word; and
  if not, sending to the receiver a data block with a number of repetitions of the data word greater than the previous one.

6. The method of claim 2, wherein the detection and synchronization steps comprise the steps of:
  performing correlations between the transmitted preamble word and second preamble words corresponding to the stored preamble word rated at a period of a receiver clock plus or minus an increment different from one second preamble word to another; and
  detecting a correlation having a highest rate and adding or removing the increment corresponding to the receiver clock.

7. The method of claim 6, comprising the steps of:
  providing a plurality of preamble words, each being associated with a different number of repetitions of the data word:
  performing, for each stored preamble word, correlations between the transmitted preamble word and second preamble words corresponding to the stored preamble word rated at the period of the receiver clock plus or minus an increment different from one second preamble word to another;
  performing the synchronous averaging according to the number of repetitions of the data word associated with the detected preamble word;
  if the data word associated with the preamble word is detected, sending a response to the transmitter so that it sends data words with the same number of repetitions as the detected data word; and
  if not, sending to the receiver a data block with a number of repetitions of the data word greater than the previous one.

8. The method of claim 2, comprising the steps:
  verified whether the detected transmitted data are correct; and
  if not, starting operation again with an increase in the number of repetitions of the transmitted data word.

9. The method of claim 8, comprising the steps of:
  providing a plurality of preamble words, each being associated with a different number of repetitions of the data word;
  performing, for each stored preamble word, correlations between the transmitted preamble word and second preamble words corresponding to the stored preamble word rated at a period of a receiver clock plus or minus an increment different from one second preamble word to another;
  performing the synchronous averaging according to the number of repetitions of the data word associated with the detected preamble word;
  if the data word associated with the preamble word is detected, sending a response to the transmitter so that it sends data words with the same number of repetitions as the detected data word; and
  if not, sending to the receiver a data block with a number of repetitions of the data word greater than the previous one.

10. The method of claim 3, comprising the steps of:
  verifying whether the detected transmitted data are correct; and
  if not, starting operation again with an increase in the number of repetitions of the transmitted data word.

11. The method of claim 10, comprising the steps of:
  providing a plurality of preamble words, each being associated with a different number of repetitions of the data word;
  performing, for each stored preamble word, correlations between the transmitted preamble word and second preamble words corresponding to the stored preamble word rated at the period of the receiver clock plus or minus an increment different from one second preamble word to another;
  performing the synchronous averaging according to the number of repetitions of the data word associated with the detected preamble word;
  if the data word associated with the preamble word is detected, sending a response to the transmitter so that it sends data words with the same number of repetitions as the detected data word; and
  if not, sending to the receiver a data block with a number of repetitions of the data word greater than the previous one.

12. The method of claim 4, comprising the steps of:
  providing a plurality of preamble words, each being associated with a different number of repetitions of the data word;
  performing, for each stored preamble word, correlations between the transmitted preamble word and second preamble words corresponding to the stored preamble word rated at a period of a receiver clock plus or minus an increment different from one second preamble word to another;
  performing the synchronous averaging according to the number of repetitions of the data word associated with the detected preamble word;
  if the data word associated with the preamble word is detected, sending a response to the transmitter so that it sends data words with the same number of repetitions as the detected data word; and
  if not, sending to the receiver a data block with a number of repetitions of the data word greater than the previous one.

13. A device of radio transmission of a data word between a transmitter and a receiver, comprising:
  the transmitter capable of transmitting at least one data block comprising a preamble word and the data word identically repeated a plurality of times;
  an elementary synchronization block enabling to synchronize the receiver to the transmitter and to detect the preamble word; and
  a synchronous averager averaging the repeated data word:
  wherein the elementary synchronization block comprises:
  a memory containing a stored preamble word:
  a plurality of correlators, each correlator having a first input receiving the transmitted preamble word, a second input receiving the stored preamble word rated at a period of a receiver clock plus or minus an increment different for each correlator, and an output supplying the correlation rate between the two inputs; and a controller detecting a correlator providing a highest correlation rate.

14. The device of claim 13, comprising a plurality of elementary synchronization blocks, each of which is capable of detecting a specific preamble word.

15. The device of claim 13, comprising a plurality of elementary synchronization blocks, each of which is capable of detecting a specific preamble word.

* * * * *